United States Patent [19]

Abe et al.

[11] 4,366,281

[45] Dec. 28, 1982

[54] MOLDING RESIN COMPOSITION

[75] Inventors: Mitsuo Abe; Akira Kamiya, both of Yokkaichi; Junya Itoh, Mie; Masaaki Mawatari, Suzuka; Fumio Kurihara, Yokkaichi, all of Japan

[73] Assignee: Japan Synthetic Rubber Co., Ltd., Tokyo, Japan

[21] Appl. No.: 201,777

[22] Filed: Oct. 29, 1980

[30] Foreign Application Priority Data

Oct. 29, 1979 [JP] Japan ................................ 54-138808

[51] Int. Cl.$^3$ ............................................... C08K 5/12
[52] U.S. Cl. .................................... 524/297; 524/296; 525/80; 525/83; 525/84
[58] Field of Search ........................... 525/83, 80, 84; 260/31.2 MR; 524/296, 297

[56] References Cited

U.S. PATENT DOCUMENTS 3,670,052  6/1972  Saito et al. ............................ 525/83
4,042,548  8/1977  Abe et al. ......................... 260/31.8 M Primary Examiner—J. Ziegler Attorney, Agent, or Firm—Oblon, Fisher, Spivak, McClelland & Maier

[57] ABSTRACT

A molding resin composition comprising [A] 100 parts by weight of a vinyl chloride resin, [B] 30–110 parts by weight of a graft copolymer wherein 90–50 parts by weight of a monomer mixture consisting of 10–40% by weight of an alkenyl aromatic compound, 20–50% by weight of an alkenyl cyanide compound and 20–50% by weight of a methacrylate is graft-copolymerized on 10–50 parts by weight of polybutadiene or a rubbery copolymer of 60% by weight or more of butadiene and a vinyl monomer copolymerizable therewith (the amount of toluene-insoluble fraction is preferably 50% by weight or less), the degree of grafting being 30–110% and the acetone-soluble fraction of the graft copolymer having an intrinsic viscosity of 0.4–1.5 dl/g as measured in methyl ethyl ketone at 30° C., [C] 3–50 parts by weight of a rubbery acrylonitrile-butadiene copolymer and [D] 15–100 parts by weight of a plasticizer for vinyl chloride resins. Said composition is suitable for producing soft or semi-rigid leather-like sheets by vacuum forming. Said sheets are excellent in heat-resistance, light-resistance and cold-resistance.

9 Claims, No Drawings

MOLDING RESIN COMPOSITION

This invention relates to a resin composition suitable for vacuum forming and capable of giving soft or semi-rigid leather-like sheets. More particularly, this invention relates to a resin composition moldable by vacuum forming and capable of giving soft or semi-rigid leather-like sheets, which comprises [A] a vinyl chloride resin, [B] an alkenyl aromatic compound-butadiene rubber-alkenyl cyanide compound-methacrylate resin, [C] an acrylonitrile-butadiene rubber and [D] a plasticizer for vinyl chloride resins.

For the production of sheets for vehicles such as automobiles, and the like, there have hitherto been proposed various processes such as production of a molded product from the above-mentioned type of resin composition by the vacuum forming technique followed by insertion of a lining cushion into its inside or followed by injecting a polyurethane or the like into the inside of the molded product and foaming the same into a sponge.

These sheets must have the following performances:

(1) When a molded product is formed from a sheet by a vacuum forming process, the molded product undergoes a much greater tension at the corner parts than at the flat parts, so that a breakage or an unevenness of thickness tends to arise at the corner parts. Therefore, the sheet must withstand the tension.

(2) Since a vacuum-formed sheet is used in a wide range of usage, it must withstand all kinds of environmental conditions. Particularly it must have heat-resistance, light-resistance, cold-resistance, etc.

As one of the usages, this sheet is widely used as dashboard leather for automobile at an ambient temperature ranging from $-30°$ C. to $+120°$ C. If the sheet is poor in performance at said temperatures, therefore, there arise problems such as crack, fissure and the like in the leather.

For coping with the problems of above item (1), the breakage and the unevenness in thickness of the corner parts have hitherto been prevented by selecting the shape of a vacuum forming die. In the case of this method, however, the shape of a molded product is restricted. Though there is another method of solving the problem by varying the formulation of the sheet-forming resin composition, this method is undesirable because it affects the physical properties of the sheet. As mentioned above, even if the breakage and the unevenness in thickness of the corner parts can be prevented by varying the shape of a die and the formulation, the design and quality, important to a commercial product, are sacrificed, resulting in a drop in commercial value.

With regard to above item (2), the improvement in heat-resistance can be achieved to some extent by changing the plasticizer added from a liquid one to a solid one or by increasing the amount of the plasticizer used. However, these changes greatly affect the texture so that the range of the change is naturally limited. Though the improvement in light-resistance is usually carried out by the addition of an ultraviolet absorber or by coating the surface of vacuum-formed product, these methods are undesirable because they result in an increase in cost. Though the improvement in cold-resistance is usually carried out by increasing the amount of acrylonitrile-butadiene rubber (NBR) in the leather-forming resin composition, the increase of the amount of NBR injures the vacuum-formability of a resin composition for leather, whereby the commercial value of the formed product is decreased.

As a result of various studies, the present inventors have found that a molding resin composition having both the performances of above items (1) and (2) can be obtained by selecting a specific composition of alkenyl aromatic compound-butadiene rubber-alkenyl cyanide compound-methacrylate type graft copolymer [B], a specific degree of grafting, and a specific intrinsic viscosity of the acetone-soluble fraction (non-graft resin phase) of the graft copolymer.

It is an object of this invention to provide a resin composition which can be vacuum-formed and can give a soft or semi-rigid leather-like sheet.

It is another object of this invention to provide a resin composition for leather having heat-resistance, light-resistance and cold-resistance.

Other objects and advantages of this invention will become apparent from the following description.

According to this invention, there is provided a molding resin composition comprising [A] 100 parts by weight of a vinyl chloride resin, [B] 30-110 parts by weight of a graft copolymer wherein 90-50 parts by weight of a monomer mixture comprising 10-40% by weight of an alkenyl aromatic compound, 20-50% by weight of an alkenyl cyanide compound and 20-50% by weight of a methacrylate is graft-copolymerized on 10-50 parts by weight of polybutadiene or a rubbery copolymer of at least 60% by weight of butadiene and a vinyl monomer copolymerizable therewith, the degree of grafting of the graft copolymer being 30-110% and the acetone-soluble fraction having an intrinsic viscosity of 0.4-1.5 dl/g as measured in methyl ethyl ketone at 30° C., [C] 3-50 parts by weight of a rubbery acrylonitrile-butadiene copolymer (hereinafter referred to as NBR) and [D] 15-100 parts by weight of a plasticizer for vinyl chloride resins.

The vinyl chloride resin [A] used in this invention is a thermoplastic resin selected from polyvinyl chloride and copolymers of a major amount of vinyl chloride and a minor amount of a monoolefinic monomer copolymerizable therewith. As the monoolefinic monomer, there may be used ethylene, propylene, vinyl acetate and the like. The degree of polymerization of the vinyl chloride resin is not critical though a value of about 500 to 1500 is usually suitable.

The graft copolymer [B] is defined as follows:

(i) The rubber constituting the backbone is polybutadiene or a copolymer of at least 60% by weight of butadiene and a vinyl monomer copolymerizable therewith, among which those having a toluene-insoluble fraction content of not more than 50% by weight are preferable. If the content of toluene-insoluble fraction exceeds 50% by weight, the elongation at high temperature of the sheet is decreased and the breakage and the unevenness in thickness of the corner parts of the molded article tend to occur at the time of vacuum forming. This fact makes the production of a molded product having a complicated design impossible and makes the production of various commercial products difficult. Said vinyl monomer copolymerizable with butadiene includes alkenyl aromatic compounds, alkenyl cyanide compounds and the like, among which styrene and acrylonitrile are particularly preferable. The backbone rubber is used in an amount of 10-50 parts by weight (namely 10-50% by weight of the graft copolymer). If the amount is less than 10 parts by weight, the sheet is poor in cold-resistance. If it exceeds 50 parts by weight, the elongation at high temperature of the sheet decreases so that the problem of breakage of sheet at the time of vacuum forming arises.

(ii) The monomer to be graft-copolymerized is a mixture consisting of 10–40% by weight of an alkenyl aromatic compound, 20–50% by weight of an alkenyl cyanide compound and 20–50% by weight of a methacrylate. Said alkenyl aromatic compound includes styrene, α-methylstyrene, vinyltoluene, m-chlorostyrene, p-chlorostyrene and the like, which may be used either alone or in admixture of two or more. Among them, styrene is particularly preferable. Said alkenyl aromatic compound gives an appropriate softness to the heated sheet at the time of vacuum forming. It is used in an amount of 10–40% by weight. If the amount is less than 10% by weight, a sufficient softness cannot be given, so that the sheet must be heated to a much higher temperature at the time of vacuum forming, and the softening requires a longer period of time, so that the productivity of vacuum forming drops. On the other hand, if the amount exceeds 40% by weight, the softening progresses excessively. Particularly when a large-sized vacuum-formed product is to be molded, a vacuum-formed product having uniform thickness cannot be obtained, which is undesirable. Said alkenyl cyanide compound includes acrylonitrile, methacrylonitrile and the like. It improves the resistance to thermal deterioration of the sheet. It is used in an amount of 20–50% by weight. If the amount is less than 20% by weight, the resistance to thermal deterioration is low. If the amount exceeds 50% by weight, the cold-resistance of the sheet decreases. Said methacrylate includes methyl, ethyl, propyl, and n-butyl methacryaltes and the like, which can be used either alone or in admixture of two or more to increase light resistance of the sheet. The amount thereof is 20–50% by weight. If the amount is less than 20% by weight, the light resistance of the sheet is unsatisfactory. If the amount is more than 50% by weight, the amounts of the alkenyl aromatic compound and the alkenyl cyanide compound decrease correspondingly so that the softening property and the resistance to thermal deterioration of the heated sheet at the time of vacuum forming become insufficient.

The degree of grafting of the graft copolymer [B] is 30–110%, preferably 50–110%. If it is less than 30%, the shrinkage at the time of sheet production is so great that a sheet having a constant dimension cannot be obtained. This is undesirable. On the other hand, if it exceeds 110%, the elongation at high temperatures of the sheet becomes small, so that the problem of breakage of sheet arises at the time of vacuum forming. The degree of grafting is determined by the following method: About 1 g of a powdery graft copolymer is accurately weighed and introduced into a 50-ml Erlenmeyer flask. Thereto was added 25 ml of acetone and the mixture is allowed to stand for 24 hours. Then, the suspension is centrifuged at 23,000 rpm for 60 minutes to separate it into an acetone-soluble fraction and an acetone-insoluble fraction. The acetone-insoluble fraction is vacuum-dried and weighed, from which the degree of grafting is calculated according to the following equation:

$$\text{Degree of grafting (\%)} = \frac{\text{Acetone insoluble fraction} - \text{Rubber content in the charged graft copolymer}}{\text{Rubber content in the charged graft copolymer}} \times 100$$

The intrinsic viscosity [η] of the graft copolymer [B] is measured at 30° C. in methyl ethyl ketone as a solvent by using the acetone-soluble fraction. The [η] affects the cold-resistance and the vacuum-formability of sheet. The range of [η] is 0.4–1.5 dl/g, preferably 0.5–1.3 dl/g. If it is less than 0.4 dl/g, the sheet is poor in cold-resistance. If it exceeds 1.5 dl/g, the elongation of sheet at high temperatures is lowered, so that the problem of breakage at the time of vacuum forming arises.

(iii) The degree of grafting and the intrinsic viscosity of the graft copolymer [B] can freely be controlled by the generally known methods. In general, they can be controlled by varying the polymerization method, the polymerization conditions, the kind and quantity of the molecular weight regulator, the kind and quantity of the initiator, etc.

In producing the graft copolymer [B], it is preferable to use a sulfoxylate recipe and a sugar-containing pyrophosphate recipe, both belonging to a redox type catalyst, in combination as the initiator, namely to employ an initiator consisting of an organic peroxide, an iron salt, tetrasodium ethylenediamine-tetraacetate, sodium formaldehydesulfoxylate, sodium pyrophosphate and anhydrous crystalline glucose. By using such an initiator, a graft copolymer having the intended degree of grafting and the intended intrinsic viscosity can easily be obtained with the following merits:

(a) The utility can be economized because the polymerization can be started at a low temperature and the time required for elevating the temperature to the desired one is correspondingly short.

(b) Since the polymerization can be started at a low temperature, the heat of reaction can be controlled easily and the polymerization can be completed at a relatively low temperature.

(c) Since the polymerization conversion is high and the amount of coagulum formed at the time of polymerization is small, the after-treatment is easy and the product yield is high.

(d) The resin obtained has a good heat-stability and is excellent in color tone.

In the molding composition of this invention, the graft copolymer [B] is used in an amount of 30–110 parts by weight per 100 parts by weight of the vinyl chloride resin used as component [A]. If the amount is less than 30 parts by weight, the molded product obtained by vacuum-forming a sheet is poor in form-retention. On the other hand, if the amount exceeds 110 parts by weight, the molded product is poor in heat-resistance and light-resistance.

The rubbery acrylonitrile-butadiene copolymer used as component [C] in this invention may be either of uncrosslinked type and partially crosslinked type. The copolymers having a combined acrylonitrile content of 20–40% by weight are generally used. The amount of the rubbery acrylonitrile-butadiene copolymer used in 3—50 parts by weight per 100 parts by weight of component [A]. If the amount is less than 3 parts by weight, the texture of the sheet is hard, and hence the sheet is undesirable as a leather-like sheet. On the other hand, if the amount exceeds 50 parts by weight, the elongation at the time of vacuum forming is low, so that a problem of breakage of sheet arises.

The kind of the plasticizer for vinyl chloride resins [D] used in this invention is not critical, though commercially available ones such as dibutyl phthalate (DBP), dioctyl phthalate (DOP), diisodecyl phthalate (DIDP) and the like can be used. There is no problem in using, in combination therewith, a secondary plasticizer for vinyl chloride resins which is generally used such as Sekisuicizer #300 (a trade name of Sekisui Kagaku K.K.). It is necessary to use the plasticizer in an amount of 15-100 parts by weight per 100 parts by weight of the vinyl chloride resin [A] in consideration of texture such as flexibility. If the amount is out of this range, a sheet having a good vacuum-formability and a good quality cannot be obtained.

It is obvious to those skilled in the art that the processability and heat-stability of vinyl chloride resins can be improved by adding thereto a stabilizer or the like. In the case of the composition of this invention, a small amount of the stabilizer for vinyl chloride resins (for example, Ca-Ba type, Pb type, Sn type) and a lubricant may be added, and a filler such as calcium carbonate or the like may additionally be added in an appropriate amount.

The resin composition of this invention for a soft or semi-rigid sheet to be used in vacuum-forming can be produced by mixing the above components in any order and by any method. As one of the appropriate methods, there can be referred to a method which comprises blending the vinyl chloride resin with the plasticizer and, if necessary, the stabilizer in a Banbury mixer at a temperature of about 150° C. until a uniform mixture is obtained, then adding NBR and the graft copolymer [B] thereto, further blending the resulting mixture at a temperature of about 180° C. until a uniform mixture is obtained, subsequently calendering the resinous mixture thus plasticized to form a sheet and then embossing the sheet to give the same an appropriate grain pattern.

This invention is illustrated below with reference to Examples. The testing methods for the physical properties mentioned in the Examples and Comparative Examples were as follows.

(1) Compounding recipe of sheet

| | |
|---|---|
| Vinyl chloride resin (Aron NS 1100, a trade name of Toagosei Chemical Industry Co., Ltd.) | 100 parts by weight |
| NBR | 10 parts by weight |
| Graft copolymer [B] | 50 parts by weight |
| Plasticizer for vinyl chloride resin (DIDP + Epoxy type) | 40 parts by weight |
| Lead type stabilizer and lubricant | 4 parts by weight |

The above-mentioned components were mixed in a mixer for 3 minutes, and the resulting mixture was formed into a sheet under the following molding conditions:

The mixture was kneaded at a roll temperature of 200° C. for 5 minutes on 6" rolls to prepare sheets having a thickness of 0.75 mm and 2.5 mm. The sheet of 0.75 mm in thickness was used in the tensile test mentioned later, while the sheet of 2.5 mm in thickness was used in the measurement of the brittle temperature.

(2) Tensile test: JIS No. 1 dumbells were punched out from the sheet and used as test pieces. Elongation at break was measured with a tensile tester equipped with a thermostat.

(3) Brittle temperature test: The brittle temperature was measured according to JIS K 6723 to evaluate the cold-resistance of sheet.

(4) Test for shrinkage of unrolled sheet: The dimensions of a sheet just after having been unrolled and a sheet after having been allowed to stand for 24 hours were measured, and the shrinkage percentage of the sheet was calculated therefrom according to the following equation:

$$\text{Shrinkage percentage of unrolled sheet (\%)} = \frac{L_1 - L_2}{L_1} \times 100$$

where
$L_1$: dimension of the sheet just after having been unrolled (cm),
$L_2$: dimension of the sheet after having allowed to stand for 24 hours (cm).

By this test, the dimensional stability of the sheet was evaluated.

(5) Thermal deterioration-resistance test: JIS No. 1 dumbbells were allowed to stand in a Geer oven at 120° C. for 60 hours and the elongations at break before and after deterioration were measured, from which the maintenance of thermal deterioration resistance was calculated according to the following equation:

$$\text{Maintenance of thermal deterioration-resistance (\%)} = \frac{\text{Elongation after thermal deterioration (\%)}}{\text{Elongation before thermal deterioration (\%)}} \times 100$$

(6) Light-deterioration-resistance test: By using a sunshine weather-o-meter, a light-deterioration-resistance test was carried out at a black panel temperature of 83° C. under a condition of no rain. The irradiation time was 60 hours. The elongations at break before and after irradiation were measured, from which the maintenance of light-deterioration-resistance was calculated according to the following equation:

$$\text{Maintenance of light-deterioration-resistance (\%)} = \frac{\text{Elongation after irradiation (\%)}}{\text{Elongation before irradiation (\%)}} \times 100$$

(7) Determination of toluene-insoluble fraction: 50 cc of toluene was added to 1 g of the sample and allowed to stand at room temperature for 24 hours, after which the mixture was shaken for 1 hour. The sample was centrifuged at 10,000 rpm for 90 minutes and the insoluble matter was vacuum-dried. The quantity of the toluene-insoluble fraction was indicated by a value obtained by dividing the weight of the insoluble fraction by the sample weight.

Examples 1-7 and Comparative Examples 1-10

Sheets were prepared by varying the composition, the degree of grafting and the [$\eta$] of the graft copolymer [B] as shown in the Table. The compounding recipe of the sheet, the forming method and the testing method were as mentioned above.

The graft copolymer [B] used in Example 2 was produced in the following manner: 10 parts by weight of potassium salt of disproportionated rosin (concentration 25% by weight), 200 parts by weight of water and 30 parts by weight (in terms of solids) of a styrene-butadiene rubber latex were placed in a polymerization reactor and stirred under a nitrogen stream, after which 3.5 parts by weight of styrene, 5.2 parts by weight of acrylonitrile, 5.3 parts by weight of methyl methacrylate, and 0.1 part by weight of t-dodecyl-mercaptan were added under a nitrogen stream in the same manner as above. When the inner temperature reached 40° C., 0.14 part by weight of cumene hydroperoxide and a solution of 0.003 part by weight of FeSO$_4$.7H$_2$O, 0.045 part by weight of ethylenediaminetetraacetic acid tetrasodium salt, 0.03 part by weight of sodium formaldehydesulfoxylate, 0.4 part by weight of sodium pyrophosphate and 0.5 part by weight of anhydrous crystalline glucose in 10 parts by weight of water were simultaneously added with continuous stirring to start the polymerization. One hour after the start of the polymerization, the inner temperature was 53° C. At this time, it was started to continuously add a mixture consisting of 14.0 parts by weight of styrene, 21.0 parts by weight of acrylonitrile, 21.0 parts by weight of methyl methacrylate and 0.4 part by weight of t-dodecylmercaptan together with 0.21 part by weight of cumene hydroperoxide over a period of 3 hours, whereby the polymerization was completed. At the end of the polymerization, the inner temperature was 75° C., and the conversion of the monomer to the polymer was 99%. The latex was coagulated with sulfuric acid, washed with water, filtered and dried to obtain a polymer.

In other Examples and Comparative Examples, the graft copolymer [B] was produced by substantially the same procedure as above, except that the amount of rubber and the proportions of monomers were varied.

light-deterioration and maintenance of resistance to thermal deterioration.

As to Comparative Examples 1 and 2:

In Comparative Examples 1 and 2, the amount of the rubber component in the graft copolymer [B] is outside this invention. The sheet of Comparative Example 1 has a high brittle temperature and a low cold-resistance. On the other hand, the sheet of Comparative Example 2 gives a great shrinkage of unrolled sheet, has a low dimensional stability and is inferior in elongation and resistance to light-deterioration, so that it is undesirable.

As to Comparative Examples 3 and 4:

In Comparative Examples 3 and 4, the amount of acrylonitrile in the graft copolymer [B] is outside this invention. The sheet of Comparative Example 3 is poor in resistance to thermal deterioration. The sheet of Comparative Example 4 has a high brittle temperature and is poor in cold-resistance.

As to Comparative Examples 5 and 6:

In Comparative Examples 5 and 6, the amount of methyl methacrylate in the graft copolymer [B] is out of this invention. The sheet of Comparative Example 5 has a high brittle temperature and is poor in resistance to light-deterioration. The sheet of Comparative Example 6 is poor in resistance to thermal deterioration.

As to Comparative Examples 7 and 8:

In Comparative Examples 7 and 8, the degree of

|  | Composition of graft copolymer [B] | | | | Polymer properties of graft copolymer [B] | | Brittle temperature (°C.) | Properties of sheet | | | |
|---|---|---|---|---|---|---|---|---|---|---|---|
|  | SBR*** (parts by weight) | Resin components (% by weight) | | | Degree of grafting | $[\eta]_{MEK}^{30°C}$ (dl/g) |  | Shrinkage of unrolled sheet (%) | Elongation at break at 180° C. (%) | Maintenance of resistance to light-deterioration (%) | Maintenance of resistance to thermal deterioration (%) |
|  |  | ST | AN | MMA |  |  |  |  |  |  |  |
| Comparative Example 1 | 5* | 25 | 37.5 | 37.5 | 80 | 0.5 | −8** | 6 | 220 | 52 | 51 |
| Example 1 | 20 | " | " | " | 70 | 0.6 | −22 | 6 | 230 | 53 | 53 |
| Example 2 | 30 | " | " | " | 55 | 0.6 | −25 | 8 | 240 | 45 | 48 |
| Comparative Example 2 | 60* | " | " | " | 50 | 0.5 | −32 | 18** | 160** | 20** | 47 |
| Comparative Example 3 | 20 | 40 | 10* | 50 | 70 | 0.6 | −30 | 6 | 230 | 52 | 25** |
| Comparative Example 4 | 20 | 20 | 60* | 20 | 60 | 0.5 | +2** | 6 | 230 | 52 | 58 |
| Comparative Example 5 | 20 | 30 | 60* | 10* | 68 | 0.5 | −5** | 5 | 210 | 21** | 56 |
| Comparative Example 6 | 20 | 25 | 15* | 60* | 74 | 0.7 | −23 | 6 | 230 | 60 | 24** |
| Comparative Example 7 | 20 | 25 | 37.5 | 37.5 | 20* | 0.5 | −22 | 15** | 220 | 51 | 54 |
| Comparative Example 8 | 20 | 25 | " | " | 120* | 0.6 | −22 | 4 | 165** | 52 | 52 |
| Comparative Example 9 | 20 | 25 | " | " | 40 | 0.3* | −8** | 5 | 210 | 53 | 51 |
| Comparative Example 10 | 20 | 25 | " | " | 80 | 1.8* | −28 | 6 | 170** | 68 | 57 |
| Example 3 | 20 | 25 | " | " | 80 | 0.5 | −20 | 6 | 230 | 53 | 50 |
| Example 4 | 20 | 25 | " | " | 82 | 0.9 | −28 | 7 | 220 | 52 | 54 |
| Example 5 | 20 | 25 | " | " | 81 | 1.3 | −30 | 5 | 210 | 55 | 51 |
| Example 6 | 20 | 25 | " | " | 40 | 0.6 | −21 | 9 | 240 | 51 | 52 |
| Example 7 | 20 | 25 | " | " | 90 | 0.6 | −22 | 4 | 220 | 52 | 51 |

Note:
*Composition, degree of grafting or [η] outside of this invention.
**The test result is undesirable as a sheet of this invention.
***Styrene-butadiene rubber (toluene-insoluble fraction: 5% by weight or less)

This invention is further explained referring to the Examples and the Comparative Examples below.

As to Examples 1 to 7:

The sheets obtained in Examples 1 to 7 are, as shown in the Table, low in brittle temperature, small in shrinkage of unrolled sheet, great in elongation at break at 180° C., and excellent in maintenance of resistance to grafting of the graft copolymer [B] is outside this invention. The sheet of Comparative Example 7 shows a great shrinkage so that it is undesirable. The sheet of Comparative Example 8 shows a low elongation at a high temperature (180° C.) and has a problem that the sheet is broken at the time of vacuum forming, so that it is undesirable.

As to Comparative Examples 9 and 10:

In Comparative Examples 9 and 10, the [η] of the graft copolymer [B] is outside this invention. The sheet of Comparative Example 9 has a high brittle temperature. The sheet of Comparative Example 10 shows a low elongation at a high temperature (180° C.), so that it is undesirable.

What is claimed is:

1. A molding resin composition comprising [A] 100 parts by weight of a vinyl chloride resin, [B] 30–110 parts by weight of a graft copolymer wherein 90–50 parts by weight of a monomer mixture comprising 10–40% by weight of an alkenyl aromatic compound, 20–50% by weight of an alkenyl cyanide compound and 20–50% by weight of a methacrylate, is graft copolymerized on 10–50 parts by weight of polybutadiene or a rubbery copolymer of at least 60% by weight of butadiene with an alkenyl aromatic compound or an alkenyl cyanide compound, the degree of grafting of the graft copolymer being 30–110% and an acetone soluble fraction having an intrinsic viscosity as measured in methyl ethyl ketone at 30° C. of 0.4–1.5 dl/g, [C] 3–50 parts by weight of a rubbery acrylonitrile-butadiene copolymer having from 20–40% by weight acrylontrile and [D] 15–100 parts by weight of a plasticizer for vinyl chloride resins.

2. The molding resin composition according to claim 1, wherein the amount of toluene-insoluble fraction in the polybutadiene or butadiene copolymer constituting the backbone of the graft copolymer [B] is 50% by weight or less.

3. The molding resin composition according to claim 1 or 2, wherein said butadiene copolymer is a copolymer of a major amount of butadiene and a minor amount of an alkenyl aromatic compound or an alkenyl cyanide compound.

4. The molding resin composition according to claim 3, wherein said butadiene copolymer is a copolymer of butadiene and styrene or acrylonitrile.

5. The molding resin composition according to claim 1, wherein the monomer mixture for forming said graft copolymer [B] comprises acrylonitrile or methacrylonitrile; at least one alkenyl aromatic compound selected from the group consisting of styrene, α-methylstyrene, vinyltoluene, m-chlorostyrene and p-chlorostyrene; and at least one methacrylate selected from the group consisting of methyl, ethyl, propyl and n-butyl methacrylates.

6. The molding resin composition according to claim 1, wherein the graft copolymer [B] has a degree of grafting of 50–110%.

7. The molding resin composition according to claim 1 or 6, wherein the acetone-soluble fraction of the graft copolymer [B] has an intrinsic viscosity of [η] of 0.5–1.3 dl/g.

8. The molding resin composition according to claim 1, 2 or 5, wherein said plasticizer [D] for vinyl chloride resins is dibutyl phthalate, dioctyl phthalate or diisodecyl phthalate.

9. The molding resin composition according to claim 1 which additionally contains a small amount of a stabilizer for vinyl chloride resins, a lubricant and a filler.

* * * * *